United States Patent [19]

Katagiri

[11] 4,154,510

[45] May 15, 1979

[54] LENS BARREL

[75] Inventor: Tohru Katagiri, Shimo-Suwa, Japan

[73] Assignee: Sankyo Kogaku Kogyo Kabushiki Kaisha, Japan

[21] Appl. No.: 778,545

[22] Filed: Mar. 17, 1977

[30] Foreign Application Priority Data

Mar. 18, 1976 [JP] Japan .............................. 51-32805[U]

[51] Int. Cl.² .............................................. G02B 7/04
[52] U.S. Cl. .................................................... 350/255
[58] Field of Search ....................... 350/187, 252, 255; 354/286

[56] References Cited

U.S. PATENT DOCUMENTS

| | | | |
|---|---|---|---|
| 3,817,601 | 6/1974 | Colaiace et al. ................... | 350/255 X |
| 3,951,522 | 4/1976 | Hashimoto et al. .................. | 350/187 |
| 4,030,113 | 6/1977 | Obreschkow ..................... | 350/255 X |

FOREIGN PATENT DOCUMENTS 1285288 12/1968 Fed. Rep. of Germany ........... 350/187

*Primary Examiner*—F. L. Evans
*Attorney, Agent, or Firm*—McGlew and Tuttle

[57] ABSTRACT

A lens barrel comprises an outer sheath internally formed with a detent step, and an inner sheath formed with a plurality of slits which are open at one end thereof and with an outward projection located on said one end and a moveable lens disposed within said inner sheath for axial movement therealong upon a relative rotational movement between said inner and outer sheath whereby relative axial movement between the inner and outer sheath is prohibited. Provision of bevelled surfaces for engagement between the outward projection and the detent step minimizes the influence of dimensional variation the inner and outer sheaths.

8 Claims, 3 Drawing Figures

LENS BARREL

BACKGROUND OF THE INVENTION

The invention relates to a lens barrel for containing a movable lens therein.

Taking lens of a camera, projection lens of a slide or cine projector, or most of objectives which comprise a plurality of single lenses contains a movable lens within its barrel for purpose of varying magnification or focussing. A mechanism for holding such a movable lens in the lens barrel comprises an outer sheath having a helical groove or a guide groove of any other configuration formed in its inner peripheral surface, and an inner sheath fitted into the outer sheath in a rotatable manner and formed with axially extending slits which are open at one end thereof. A frame which retains a movable lens is fitted into the inner sheath so as to be slidable therein in the axial direction, with tabs which extend radially outward from the periphery of the frame passing through the slits in the inner sheath into engagement with the guide groove in the outer sheath. By turning either one of the outer and the inner sheath while holding the other in a stationary manner, the points of intersection between the slits and the guide groove, and hence the radial tabs as well as the lens frame integral therewith undergo an axial movement.

It is necessary to prevent a relative axial movement between the both sheaths while permitting a relative rotation therebetween. This end is achieved in the prior art by using a separate member which retains the both sheaths in a manner to permit a relative rotation therebetween. By way of example, an annular connection member is employed which is threadably engaged with the end of the outer sheath and which is provided with an inwardly directed flange, which bears against the end of the inner sheath.

OBJECTS

It is an object of the invention to permit a connection between an outer and inner sheath in a manner to permit a relative rotation therebetween without using any separate connection member, thus simplifying the construction and assemnbly.

It is another object of the invention to eliminate an adverse influence of dimensional variation of the outer and the inner sheath, for example, a rattling therebetween.

SUMMARY OF THE INVENTION

In accordance with the invention, an inner sheath is formed with a plurality of slits which are open at one end thereof, and is also formed with an outward projection on said one end, which is resiliently urged into engagement with a detent step formed on the inner surface of an outer sheath. This avoids the need for a separate connection member, reducing the number of parts and greatly simplifying the assembly.

According to another aspect of the invention, both the outer projection and the detent step are formed with bevelled surfaces for engagement therebetween. This minimizes the influence of any slight dimensional variation of the both sheaths, for example, a rattling therebetween, since the resilience of the inner sheath assures a positive bearing engagement of the outward projection thereof against the detent step of the outer sheath.

Components parts which constitute the lens barrel of the invention may be molded from a synthetic resin material, thus further simplifying its production. Alternatively, the parts may be formed of metals, or metal parts and molded parts may be used in combination.

DETAILED DESCRIPTION OF EMBODIMENTS

Figure 1:
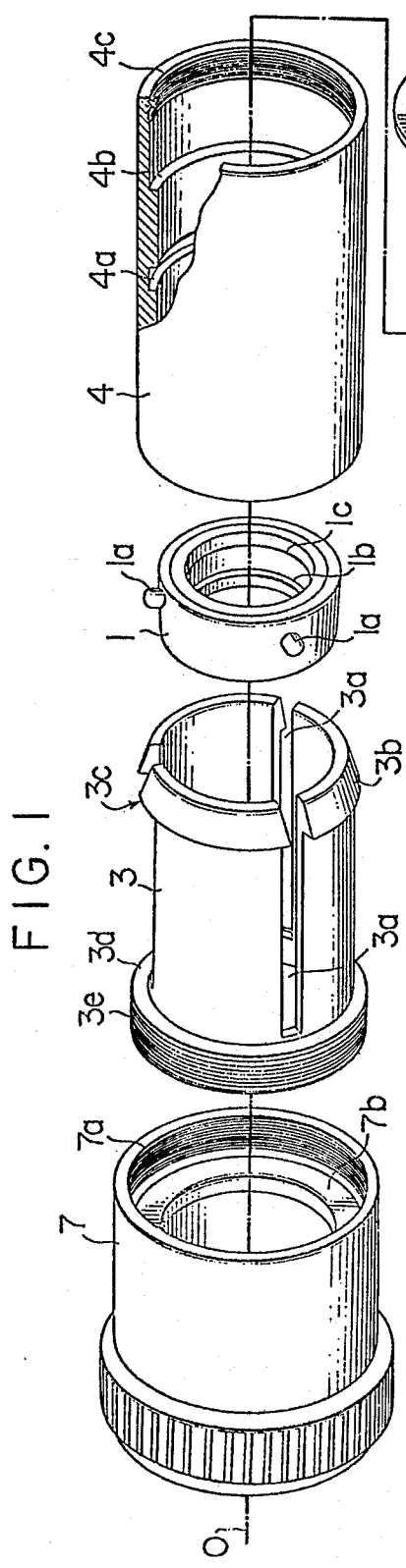
FIG. 1 is an exploded, perspective view of one embodiment of the invention.
Figure 2:
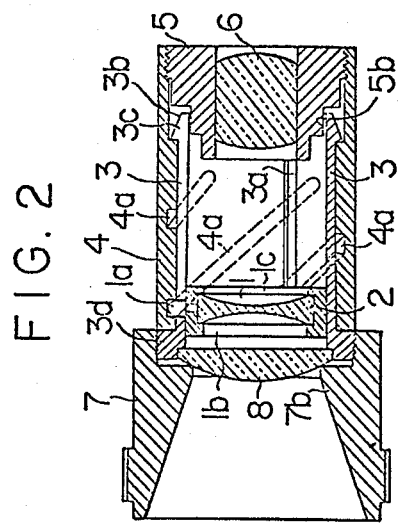
FIG. 2 is a longitudinal section of the embodiment when assembled.

FIG. 1 shows an embodiment of the lens barrel according to the invention which may be suitable for use as a relatively simple zoom lens barrel, for example, for use with a projection lens of a cineprojector. For simplicity of drawing, individual lens elements are omitted from illustration in FIG. 1. Referring to FIGS. 1 and 2, a frame 1 which retains a movable lens is provided with three radially outwardly extending tabs 1a, which are fixedly mounted on and equiangularly spaced apart along the peripheral surface. The frame 1 is also provided with an inwardly directed flange 1b and a stop ring 1c, between which a convex lens 2 is retained. The lens frame 1 is disposed within and held by an inner sheath 3, which is formed with three axially extending slits 3a which are open at one end, namely, at the right-hand end thereof, as viewed in FIG. 1. These slits 3a are also equiangularly spaced. The tabs 1a of the lens frame 1 are inserted into the slits 3a through their open end and are thus slidable along an optical axis O, but cannot rotate about the optical axis. On its end adjacent the open end of the slits 3a, the inner sheath 3 is provided with projections 3c around its outer periphery. The projections 3c are hook-shaped in cross section and have an outwardly tapered surface 3b. On the opposite end, the outer periphery of the inner sheath 3 is provided with a flange 3d, which is peripherally formed with a male thread 3e. The sheath 3 may be formed of a metal or a synthetic resin material having a suitable resiliency and elasticity, provided the material used provides flexibility when the slits 3a which are open at one end are formed.

The inner sheath 3 is fitted into an outer sheath 4 so as to be rotatable therein about a common axis. The flexibility above referred to is utilized when fitting the sheath 3 into the sheath 4. Specifically, during the assembly, the lens frame 1 is initially moved within the sheath 3 until the inner end of the slits 3a is reached. Then the projections 3c of the sheath 3 are puckered against the resilience of the sheath 3 before insertion into the outer sheath 4. The inner surface of the outer sheath 4 is formed with three guide grooves 4a, which are formed at a given interval and at a given helical angle and which are open at the left-hand end of the sheath 4, as viewed in FIG. 1. The tabs 1a extending outwardly through the slits 3a in the inner sheath 3 have their tip engaged with the respective guide grooves 4a through their open end. Thus the tabs 1a of the lens frame 1 are located on the points of intersection between the guide grooves 4a in the outer sheath 4 and the slits 3a in the inner sheath 3, thus allowing the lens frame 1 to be precisely positioned. Toward the opposite end or the right-hand end as viewed in the drawings, the inner surface of the outer sheath 4 is formed with a step or shoulder 4b, into which the hook-shaped projections 3c of the inner sheath 3 snap under the resilience of the split sheath construction upon movement of the flange 3d into abutment against the left-hand end face of the outer sheath 4, thus permitting a relative rotation of the outer and inner sheaths about the axis while preventing a relative axial movement therebetween.

Adjacent the opposite end, the inner surface of the outer sheath 4 is formed with a female thread 4c, which is threadably engaged with a male thread 5a formed on one end of the outer periphery of a lens sheath 5 carrying a master lens 6. When the sheaths 4, 5 are connected together in this manner, a peripheral surface 5b of the sheath 5 which is formed in the form of steps extends inside the end of the inner sheath 3 on which the projections 3c are formed, thus preventing the disengagement of the projections 3c from the detent step 4b. The male thread 3e on the opposite end of the inner sheath 3 is threadably engaged with a female thread 7a formed in the inner peripheral surface of a lens hood 7 at its adjacent end, thus connecting the hood 7 with the inner sheath 3. Adjacent the thread 7a, the hood 7 is internally formed with an annular step 7b, and a focussing lens 8 is held between the step 7b and a step formed in the inner surface of the sheath 3 at its adjacent end.

Assuming that the outer sheath 4 is held stationary, when the lens hood 7 is turned about the optical axis O, the inner sheath 3 which is substantially integral therewith rotates relative to the outer sheath 4, whereby the points of intersection between the slits 3a and the guide grooves 4a shift in the axisl direction to result in an axial movement of the lens frame 1 within the inner sleeve 3, thus achieving a continuous change of the magnification of the entire lens system.

Figure 3:
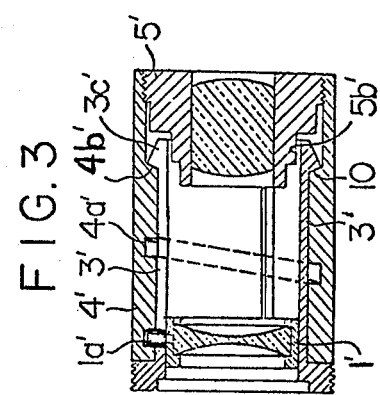
FIG. 3 is a fragmentary longitudinal section of another embodiment of the invention.

When the detent step 4b of the outer sheath 4 and the projections 3c of the innser sheath 3 have mating surfaces which extend in a direction perpendicular to the optical axis 0 as shown in the embodiment of FIGS. 1 and 2, it will be appreciated that a dimensional variation of these sheaths may cause problems. For example, if the position of the step 4b in the outer sheath is slightly displaced to the right of the design position, the projections 3c may not be engaged with the detent step 4b. On the contrary, if it is displaced in the opposite direction, a clearance may be produced between these mating elements, causing a rattling between these sheaths in the direction of the optical axis 0. FIG. 3 shows another emnodiment which overcomes this difficulty. Specifically, in this embodiment, the projections 3c ' and the detent step 4b' are formed such that their mating surfaces 10 are bevelled surfaces which form an obtuse angle with the optical axis 0. In the presence of any dimensional variation of the outer and inner sheaths, the resilience of the inner sheath 3' will reliably urge the bevelled surface of the projections 3c' into abutment against the bevelled surface of the detent step 4b', and the occurrence of a rattling is also avoided. Any displacement in the location of engagement between the projections 3c' and the detent step 4b' may cause a slight deformation of the inner sheath 3', but the deformation remains to be radial only, without loss of the linearity of the slits 3a.

In FIG. 3 grooves 4a' is shown to be a continuous helical groove and lens frame 1' includes helical projections 1a'.

For photographic zoom lens, the movable lens involved with the variable magnification experiences a complex movement, and accordingly the guide grooves in the outer sheath and the slits in the inner sheath are not so simply configured as shown. However, the required modification of the guide grooves and the slits will be within the skill of the artisan.

As an alternative, the guide grooves 4a in the outer sheath may be replaced by a continuous helical groove 42, of FIG. 3, which is engaged by a helical projection 1a' on the outer periphery of the lens frame 1'. In this instance, the slit 3a is formed into a corresponding configuration. The number of slits 3a in the inner sheath may be changed provided a plurality of slits are formed. However, the provision of three slits as shown is preferred in view of providing the stability for the movement of the movable lens with a simplified construction. Finally, the sheath 5 for holding the master lens 6 may be secured in the outer sheath 4 as by welding or adhesion.

What is claimed is:

1. A lens barrel comprising an outer sheath having a guide groove and a detent step formed in its inner surface, an inner sheath made of resilient flexible material having a plurality of slits formed therein which are open at one end thereof and extend entirely through said one end of said inner sheath, said one end being adjacent said detent of said outer sheath and having an outward projection at said one end, said one end of said inner sheath with said outward projection being inserted into said outer sheath so that said outward projection snap fits into the detent of said outer sheath through the resilient flexible nature of said inner sheath, said outward projection being engaged within the detent step, and a frame for retaining a movable lens, said frame being slidably disposed within said inner sheath and having at least one radially outwardly extending tab which extends through at least one of the slits in said inner sheath into engagement with the guide groove, whereby said tab is located at the points of intersection between the guide groove and the slits.

2. A lens barrel according to claim 1 in which the guide groove is formed as a continuous helical groove and the tab is constituted by a helical tab extending from the outer periphery of the frame.

3. A lens barrel according to claim 1, further comprising a lens hood connected with the opposite end of the inner sheath, whereby the lens hood may be turned to cause an axial movement of the frame while holding the outer sheath in a stationary manner.

4. A lens barrel according to claim 1 in three guide groove are formed in the outer sheath at an equiangular spacing and three of the slits are formed in the inner sheath at an equiangular spacing.

5. A lens barrel according to claim 1 in which the guide groove in the outer sheath is helical in configuration while the slits in the inner sheath are recti-linear.

6. A lens barrel according to claim 1 in which a third sheath carrying a master lens is connected with an end of the outer sheath which is adjacent said one end of the inner sheath.

7. A lens barrel according to claim 6 in which the third sheath prevents the inner sheath from being disengaged from the outer sheath.

8. A lens barrel according to claim 1 in which the mating surfaces of both the detent step and the outer projection are formed as bevelled surfaces.

* * * * *